(12) United States Patent
Ceballos (10) Patent No.: US 7,791,916 B2
(45) Date of Patent: Sep. 7, 2010

(54) PRISM-TYPE ELECTRICAL CONVERTER FOR THE GENERATION, TRANSMISSION, DISTRIBUTION AND SUPPY OF ELECTRIC CURRENT, AND PRODUCTION METHOD THEREOF

(76) Inventor: Vicente Arturo Mendoza Ceballos, Emiliano Zapata No 38, Col Santa Cruz Amilpas, C.P., 71226 Oaxaca, Oaxaca (MX)

( * ) Notice: Subject to any disclaimer, the term of this patent is extended or adjusted under 35 U.S.C. 154(b) by 515 days.

(21) Appl. No.: 11/910,801

(22) PCT Filed: May 22, 2006

(86) PCT No.: PCT/MX2006/000039

§ 371 (c)(1),
(2), (4) Date: Oct. 5, 2007

(87) PCT Pub. No.: WO2006/126868

PCT Pub. Date: Nov. 30, 2006

(65) Prior Publication Data

US 2008/0192522 A1    Aug. 14, 2008

(30) Foreign Application Priority Data

May 23, 2005    (MX) .................. PA/A/2005/005770

(51) Int. Cl.
*H02M 5/06* (2006.01)
(52) U.S. Cl. .................................... 363/154
(58) Field of Classification Search ............ 363/153, 363/154

See application file for complete search history.

(56) References Cited

U.S. PATENT DOCUMENTS

| | | | | |
|---|---|---|---|---|
| 1,746,259 | A | * | 2/1930 | Jonas ........................ 363/154 |
| 2,014,733 | A | | 9/1935 | Hansell |
| 2,790,131 | A | * | 4/1957 | Nyyssonen ................ 363/154 |
| 2,975,357 | A | | 3/1961 | Manning |
| 3,129,377 | A | * | 4/1964 | Monroe et al. ............. 363/154 |
| 3,278,825 | A | | 10/1966 | Haas, Jr. |
| 3,375,429 | A | * | 3/1968 | Pagano ..................... 363/154 |
| 4,639,610 | A | * | 1/1987 | Del Vecchio et al. ....... 363/154 |

FOREIGN PATENT DOCUMENTS

| | | |
|---|---|---|
| EP | 0962949 | 12/1999 |
| GB | 545425 | 5/1942 |
| GB | 611026 | 10/1948 |
| JP | 61104605 | 5/1986 |
| JP | 61248508 | 11/1986 |

OTHER PUBLICATIONS

International Search Report; PCT/MX2006000039; Jul. 14, 2006; L. Garcia Aparicio.

* cited by examiner

*Primary Examiner*—Bao Q Vu
*Assistant Examiner*—Jue Zhang
(74) *Attorney, Agent, or Firm*—Defillo & Associates, Inc.; Evelyn A. Defilló

(57) ABSTRACT

The invention relates to a prism-type electrical converter for the generation, transmission, distribution and supply of electric current. The electrical converter includes two systems, a magnetic system and an electrical system, plus an additional thermal control or cooling system. As a result, the converter has three-phase side.

11 Claims, 9 Drawing Sheets

Figure 1

(PRIOR ART)

Figure 2

(PRIOR ART)

FIGURE 3

(PRIOR ART)

PRISM-TYPE ELECTRICAL CONVERTER FOR THE GENERATION, TRANSMISSION, DISTRIBUTION AND SUPPY OF ELECTRIC CURRENT, AND PRODUCTION METHOD THEREOF

SCOPE OF THE INVENTION

This invention generally refers to the generation, transmission, distribution and supply of electric power. More specifically, this invention refers to a prism-type converter constituted by two systems, one of said systems is magnetic and the other one electric, and in addition it includes a cooling or thermal control system due to the fact that said converter has a three-phase side, where the magnetic circuit is based on the three-phase magnetic circuit and the two-phase side is built on the three magnetic circuits that form it, that is, it is constituted by a silicon steel magnetic core that may be of a column type with sections shaped in any form, of a continuous core, or it can be rolling, columned, or shielded, etc. It can also be of an Evans type just like the above but broken, or it can be of a Wescord type but coiled with junctions. Its operation principle is based on the vectorial sum of the two existing phases to produce the non-existing third phase which makes it different from all the other electric converters such as the Scott type. The prism type, an open Delta, of this invention creates a third phase as the output of this conversion, due to the fact that the three phases are created therein through the digital commutation from a direct current source.

BACKGROUND

Figure 1:
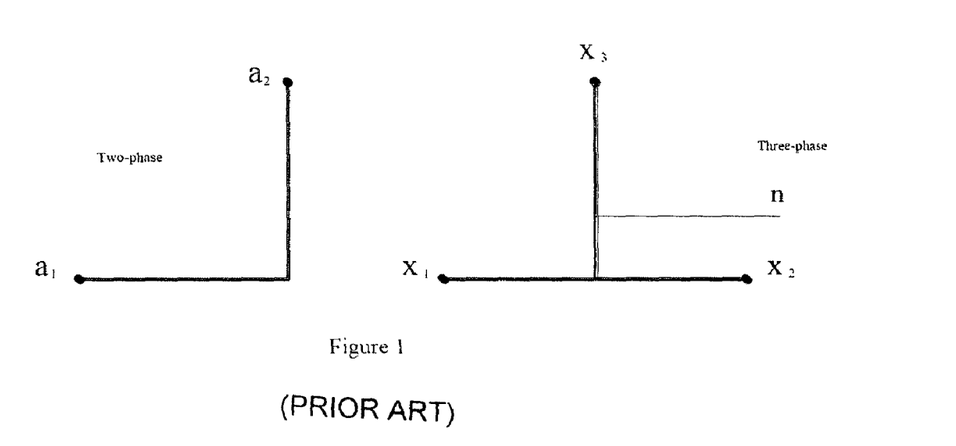
FIG. 1 describes the Scott connection invented late in the XIX century.

To date, we are familiar with two or three-phase electric converters, such as those invented in the XIX Century with the developments called Scott and Open Delta; from which the Scott system cannot be applied to the present electric nets, because said nets are only used to feed from three to two phases in electric melting furnaces, and the reverse application of two or three phases is not possible as illustrated in FIG. 1. The open Delta System is still in use and it provides three-phase power in a distribution system but its efficiency is only of 57.7% (Chester L. Dawes), illustrated in FIG. 2 herein.

Lastly, it provides unbalanced neutral voltage and also unbalanced currents.

At present, there are two or three-phase electric converters only for low voltage electric or electronic engines. The one with the best operating performance is electronic but it is limited by the fact that it only works from low voltage to low voltage and its use is extremely expensive, in addition, its application depends on the nature of the connected charge.

Figure 5:
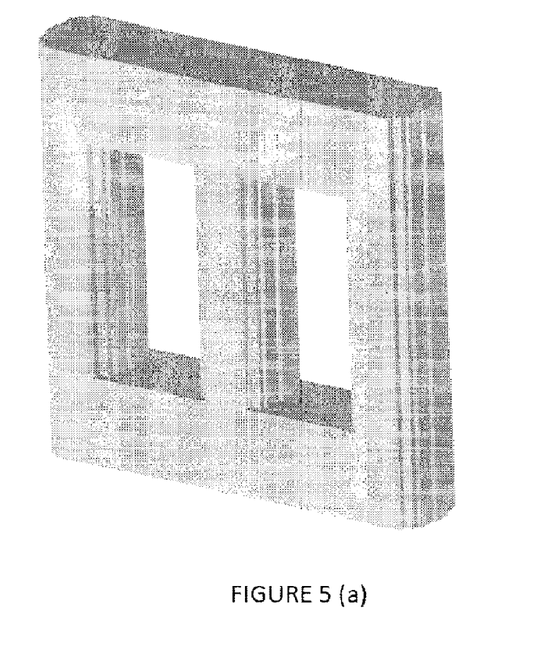
FIG. 5 describes the types of cores of present practical use; that is, as the present prism type electric converter is constituted.
Figure 5C:
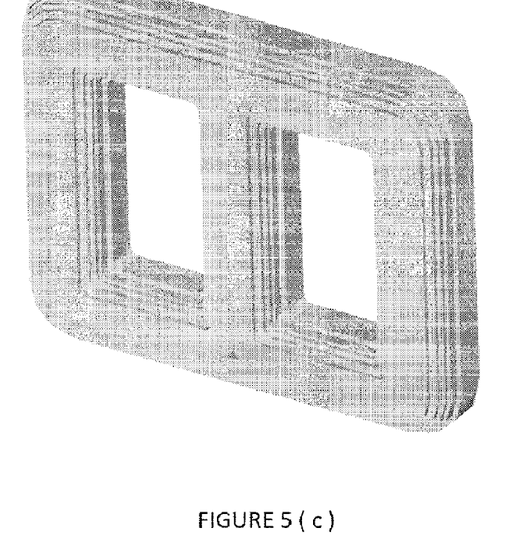
Figure 5D:
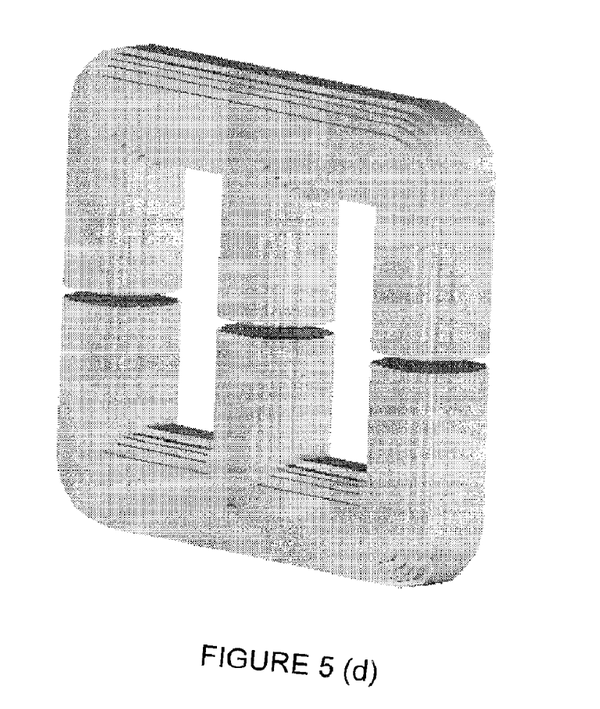

The other electric converters called prism as the one shown in FIG. 5, a practical example of how it is built with a silicon steel magnetic core that may be of a column type with sections shaped in any form, of a continuous core, or it can be rolling, columned, or shielded, etc.; it can also be of an Evans type just like the above but broken, or it can be of an Wescord type but coiled with junctions.

The difference of the converter in this invention regarding its operation is that it is based on the vectorial sum of the two existing phases so that they produce the third non-existing phase. That is; a prism-type converter, in contradistinction to other electric converters, such as the Scott or open Delta converters creates a third phase as the result of this conversion, because in the electric converter, for example, the three phases are created through digital commutation from an electric current source.

DESCRIPTION OF THE INVENTION

Thus, the purpose of this invention is to provide a new and improved prism-type electric converter from two to three phases from high voltage to high voltage, from high voltage to medium voltage, and from medium voltage to low voltage and reversible.

Another more specific purpose of this invention is to provide a prism type electric converter with improved conversion efficiency.

Yet another purpose of this invention is to provide a prism type electric converter that can be applied to any electric system from generation, transmission, distribution to supply of electric power.

An additional purpose of this invention is to provide a prism type electric converter built with two systems, one of which is magnetic and the other one electric having a cooling or thermal control system due to the fact that the converter has a three-phase side.

And still another purpose of this invention is that the magnetic circuit of the converter has as its foundation the three-phase magnetic circuit and it also has a two-phase side that is constructed in the three magnetic circuits that form it.

The purposes mentioned above and other purposes that shall become evident as this invention is described and that are fulfilled through the prism type electric converter which is a universal converter because it is applicable to all of the electric systems from generation, transmission, distribution to supply systems, and which in addition provides very high efficiency up to 98%, that is, almost 100%, perfection in efficiency, depending on the power, totally balanced in voltages between phases and between phases and neutral can feed any type of charge such as: one phase, two-phase or three-phase, any power is higher through supply to Scott or open Delta type electric converters and because of its application and the fact that it is universal to low voltage electric and electronic converters.

Figure 3:
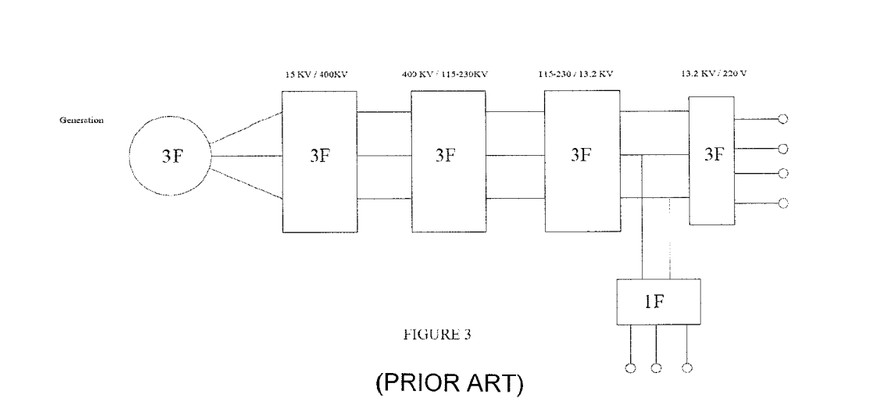
FIG. 3 describes the alternating current Electric distribution system of general use to generate, transmit and distribute alternating electric power.

It can be seen that in the alternating current distribution systems used in all the countries in the world as shown in FIG. 3 from a normal three or four threads three-phase line a three-phase medium voltage service is obtained.

Figure 2:
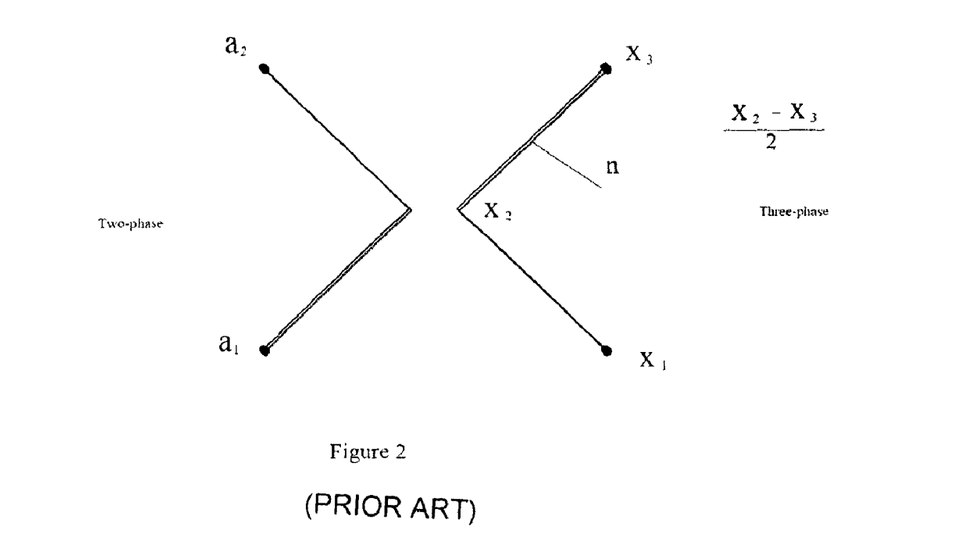
FIG. 2 describes the open Delta connection invented late in the XIX century.

Nevertheless, in small cities, in towns and suburban zones and in the country the use of three-phase lines is not profitable for electric power generating companies because the number of users is not enough to compensate for the installation cost. Consequently, in some countries in Europe and in the United States the option is to install two wire two-phase nets and provide one phase residential services and when a three-phase service is required the net is completed but it is charged to the user making the cost very high for the final user because three-phase electric power is in great demand. This system does not fulfill the needs of the user fully because it must be complemented for example with systems that work especially well or efficiently but at a very high cost. One of those systems is that used by the CFE in Mexico called open Delta that provides an unbalanced three-phase service but with a low efficiency percentage, if only 57.7% is used with two one phase transformers, as seen in FIG. 2.

This same unfulfilled need, has also caused the proliferation of capacitive converters with a very selective application to electronic converters that have a very high cost for power higher than 15 KVA that are only used now at a low voltage so the cost of a one phase feeding substation must be added to the cost of said converters.

Figure 4:
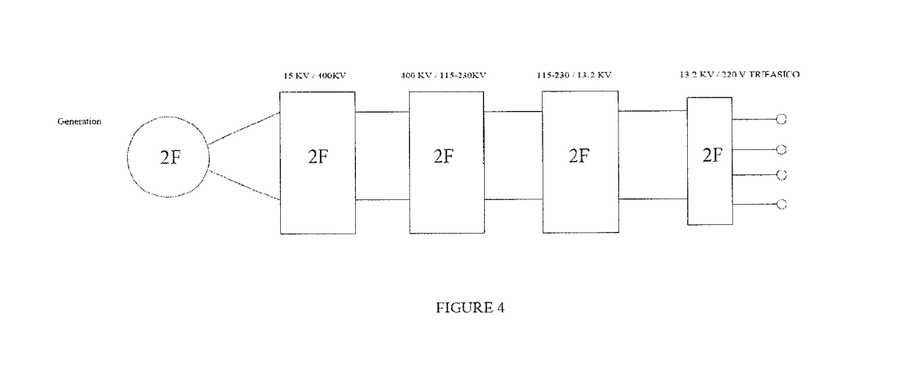
FIG. 4 describes the electric system in the application of the prism type electric converter of this invention.

FIG. 4 shows the proposed answer for distribution systems that can solve the problem all over the world because medium voltage nets can be built in two wires and the power companies can solve the expansion problem and at first the charges could be one phase charges, but in contrast with the traditional distribution system any user who requires a three-phase service can obtain it from the proposed converter, in its application from medium voltage to low voltage.

BRIEF DESCRIPTION OF THE DRAWINGS

FIGS. 7(a) and (b) describe the core of the prism-type ETO 240-2/3 electric connection of the coil, of the prism-type converter of this invention, and show the application to the column and shielded Wescord cores, respectively.

DETAILED DESCRIPTION OF THE INVENTION

FIG. 1 describes the Scott connection invented late in the XIX century, one of the first two—three-phase electric converters invented with the developments called Scott and open Delta, where the Scott system cannot be applied to the present nets that are used only to feed from three to two phases in electric melting furnaces and where the reverse application from two to three phases is not possible.

FIG. 2 describes the open Delta connection in force at present that provides three-phase power in distribution systems but the efficiency of which is 57.7% (Chester L. Dawes). FIG. 2 is an illustrative layout of this open Delta connection that also presents unbalanced voltages at neutral and also unbalanced currents.

FIG. 3 describes the distribution electric system of a present general use to generate, transmit and distribute alternating current power where the alternating current distribution electric system is used all over the world and which shows that from a normal three-phase line in three or four wires a three-phase medium voltage service is obtained.

FIG. 5 describes the types of cores; that is, how the present prism-type electric converter is constituted, where the silicon steel magnetic core is shown, said core can be of a column type with section in any shape; that is, round, elliptical, cross-shaped, etc. But, it can also be (not shown) of an Evans type like the above but broken, of a Wescord type or rolled with coil with junctions. Its operational principle is based on the vectorial sum of the two existing phases so that they produce the third non-existing phase, in contradistinction to other electric converters, such as the Scott or open Delta converters creates a third phase as the result of this conversion, for example in the electric converter (not shown) the three phases are created through digital commutation from an electric current source. Up to know only the previous data of the electric converters related to the prism type electric converter of this invention have been described.

FIG. 4 describes the possible electric system for the innovative application of the prism type electric converter of this invention, as the proposed answer for distribution systems and thus this representation is explained for a general problematic, due to the fact that low voltage nets can be constructed on two wires, therefore, electric power companies would solve the expansion problems because if the charges are one phase charges, with the traditional distribution system (not shown) any user requiring a three-phase service, could obtain it from the electric system of the proposed converter, in its medium tension to low tension distribution application.

Figure 6:
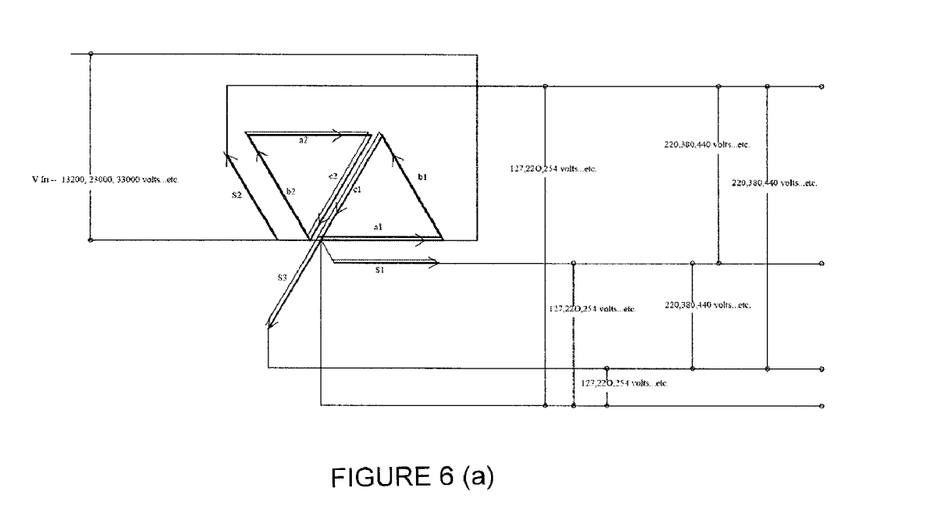
FIG. 6(a) vectorially describes the electric system or ETO 120-2/3 of the prism type converter (prism connection) of this invention.
FIG. 6(b) illustrates the prism connection ETO-240 2/3 of this invention

FIG. 6(a), vectorially describes the electric system of the prism-type converter (prism connection) or ETO 120-2/3 shown in this invention with the precise details of prism connections, which means that it is the prism converter connected to 120° electric that converts from two (2) to three (3) phases, as can be seen in the figure. The phase is formed by two sections for example phase a by sections a1 and a2, phase b by sections b1 and b2, and phase c by sections c1 and c2, where the general phases can be any one of them a, b, or c, where in said FIG. 6, it can be noted that phases a and b form phase c. The section of phase c1 is formed by a1 and b1, the section of phase c2 is formed by a2 and b2. When phase c is formed this originates the corresponding phases, a with s1, b with s2 and c with s3. The angular displacement obtained in these phases is 120° E (electric degrees), just as in a typical three-phase system, and it generates symmetric voltages between phases and between phases and neutral. For example, for Mexico the feeding voltage can be 13200, 23000, or 34500 volts, the most common output shall be 220 volts between s1 and s2, 220 volts between s2 and s3, 220 volts between s1 and s3 and 127 volts between s1 and n, 127 volts between s2 and n, and 127 volts between s3 and n. The input voltage values can be of any common or special use value or of a special value on the two-phase side, and on the three-phase side the voltage values can be of any common or special use value.

FIG. 6(b) illustrates the prism connection ETO-240 2/3, shows that it operates just as in FIG. 6(a), the difference is the angular displacement of the two input vectors that in this case have a 240° E (electric degrees) displacement.

Figure 7:
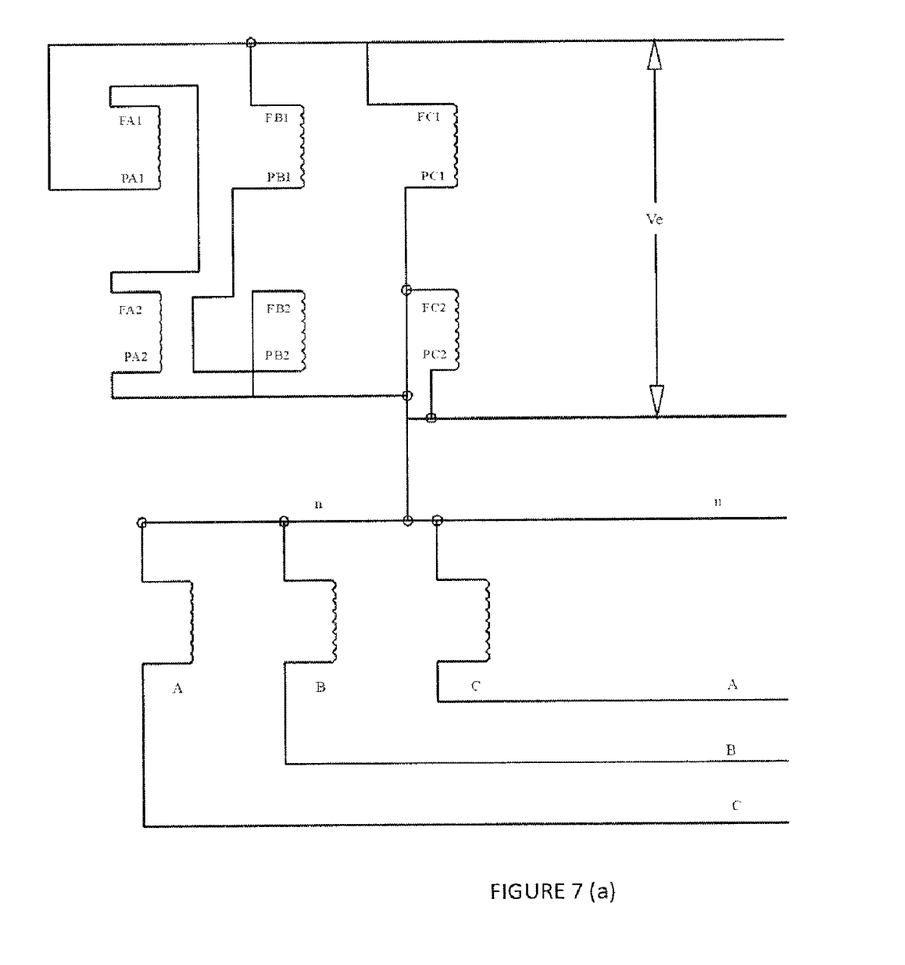
Figure 8:
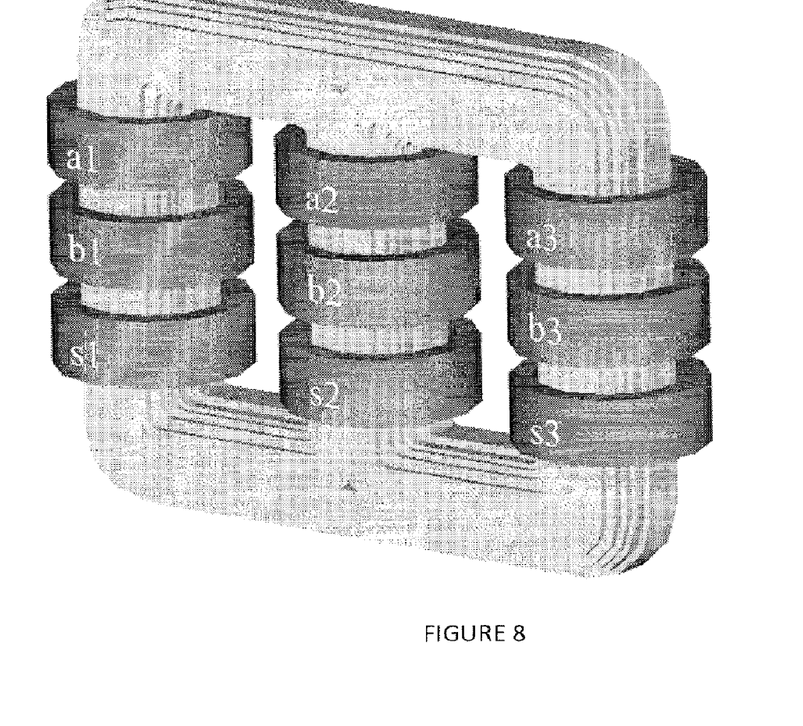
FIG. 8 describes the possible physical arrangement of the prism system of the prism type converter of this invention.

FIGS. 7(a) and 7(b) describe the core-coil arrangement of the prism type electric connection ETO-240-2/3 of the prism-type converter of this invention, and show the application of the column type core and of the shielded wescord core respectively, where the winding is formed by three sections, two medium voltage sections and one low voltage section connected in the way described in FIGS. 6(a) and 6(b) according to the input voltage equation for balances systems which is:

$$P_{ENT} = 2 V phase\ I phase$$

Where PENT=Voltage input in watts
Vphase=phase voltage in volts
I phase=phase electric current in amperes
And in accordance with the output voltage equation which is:

$$P_{SAL} = 3 V phase\ I phase$$

Where PSAL=Voltage output in watts
Vphase=phase voltage in volts
I phase=phase electric current in amperes FIG. 8 describes the possible physical arrangement of the prism system of the prism type converter of this invention.

Figure 9:
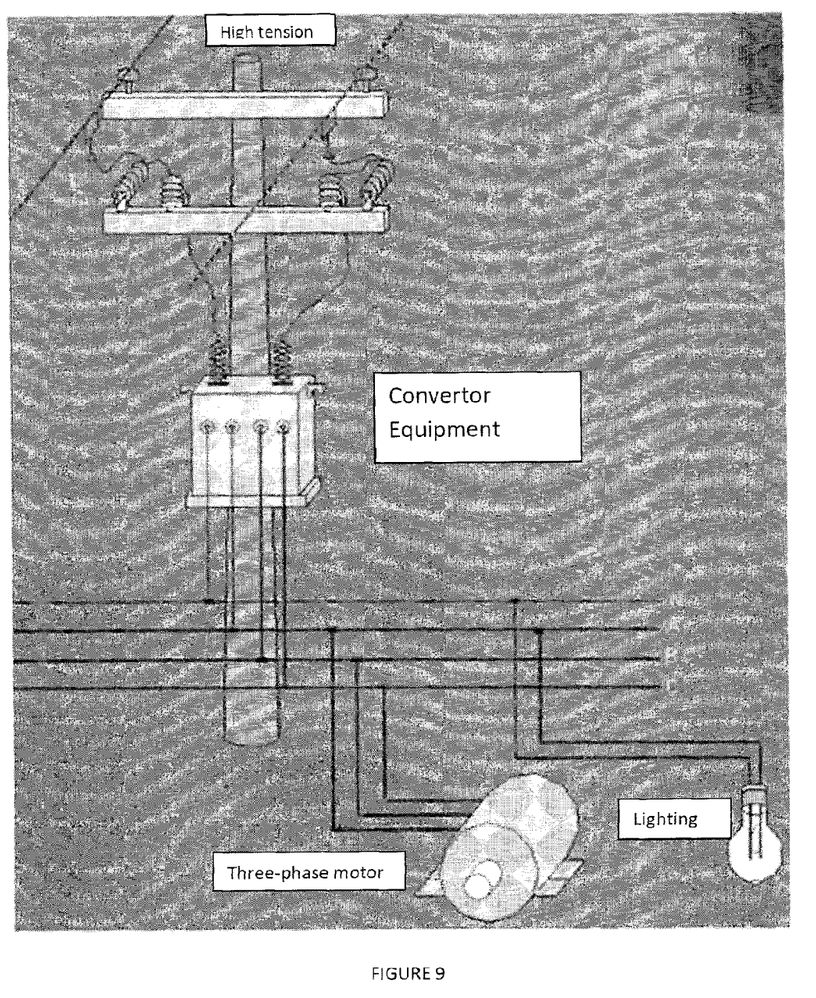
FIG. 9 describes the exterior physical presentation of the prism type converter of this invention.

Finally, FIG. 9 describes the exterior physical presentation of the prism type converter of this invention, where said converter is built as follows: the magnetic core is manufactured conventionally; that is, the broken column cores are made by means of a cut or the rolled sheet, these cuts are made at 90° or at a 45° angle depending on the design of the core. Once the cuts have been made, they are piled up so that they form a three-phase set that can be shaped as a star, in a Delta or on Planes as shown on FIG. 5. This type of cores can also be manufactured in a continuous form with few cuts, thus these are spiral cores, once the form of the section is decided. Said form can be round, in steps, elliptical, cross-shaped, etc., three round packages are formed by means of perfectly compact winding, once this stage has concluded they are pressed to give them the desired shape designed according to the distribution voltages, or to higher voltages, and finally the definitive core is formed as shown in FIG. 5. During said process mechanical efforts that alter the molecular grid and cause magnetic losses can be found during the machining. Said losses can be reduced submitting the core to an annealing process.

The Evans core is the same but with cuts that form two assembled halves after the corresponding coils have been mounted.

Another quite spread method at present is the one called rolled or Wescord that consists in making four broken sheet packages called major harness and minor harness; that is, the round sections are formed after the cut by means of winding, compacting and pressing to give them the definitive shape, also submitting them to an annealing process to minimize magnetic losses. These are some of the magnetic cores that form the three-phase magnetic circuit used to build the prism-type converter of this invention.

Anyhow, the electric part is manufactured in three columns, each for each one of the phases in an enfolding electric circuit (spiral columns, Evans, etc.) or in an enfolding magnetic system (shielded Wescord, spiral shielded, broken shielded, etc.). The coils are built with windings considering the number of turns required for each two-phase or three-phase voltage, where the winding for each phase is formed by two actions per phase for the two-phase side, one section per phase for the three-phase part as in FIGS. 7(a) and 7(b).

Then, any two-phase voltage or three-phase high voltage, medium voltage or low voltage can be used; any current density typical in electric conductors that do not surpass their thermal limits according to the kind of insulation can be used; in this case the magnet wires, the plates, the sheets and the insulation used in general worldwide in accordance with international standards in this matter can be used.

Therefore, this invention in the distribution field represents a very important benefit for power generating companies because it saves 33% of the installation equipment in the distribution net, there are more users with two-phase lines and the benefit can be extended anywhere, such as medium size communities or the country where they can potentially provide the three-phase service to whoever might need it. This benefit can also be extended to the transmission and to the generation of electric power.

The invention claimed is:

1. A prism electric converter to generate, transmit, distribute, and supply electric power comprising:
   a magnetic system having a magnetic core;
   an electric system;
   a cooling system or a thermal control system;
   wherein the converter is based on a vectorial sum of a first phase (s1) and a second phase (s2) to generate a non-existing third phase (s3);
   wherein the magnetic circuit is a three-phase magnetic circuit;
   wherein the first phase (s1) is formed by a first sectional and a second section a2;
   wherein the second phase (s2) is formed by a first section b1 and a second section b2;
   wherein the third phase (s3) is formed by a first section c1 and a second section c2;
   wherein the section c1 is formed by the first sectional of the first phase and the first section b1 of the second phase;
   wherein the section c2 is formed by the second section a2 of the first phase and the second section b2 of the second phase;
   wherein the converter has an angular displacement of 120 electric degrees or 240 electric degrees;
   wherein the voltages between the phases and between the phases and neutral n is symmetrical; and
   wherein there are feeding voltages and output voltages between s1 and s2, between s2 and s3, between s1 and s3, between s1 and neutral n, s2 and neutral n, and between s3 and neutral n.

2. The prism electric converter according to claim 1, wherein the magnetic system is formed from a silicon steel magnetic core of a column type having a section having a shape chosen from round, elliptical, cross-shaped, spiral, or broken at 90° or 45°.

3. The prism electric converter according to claim 1, wherein the magnetic system is a broken Evan type.

4. The prism electric converter according to claim 1, wherein the magnetic system is chosen from a Wescord type or rolled with junctions.

5. The prism electric converter according to claim 1, wherein the prism-type electric converter provides three phases from high voltage to high voltage, from high voltage to medium voltage, and from medium voltage to low voltage and reverse.

6. The prism electric converter according to claim 1, wherein the electric conversion can be extended from two to six phases.

7. The prism electric converter according to claim 5, wherein the third phase depends on the first phase and the second phase.

8. The prism electric converter according to claim 1, wherein the prism-type electric converter allows to obtain a three-phase system balanced with neutral to connect any three-phase, two-phase, or one phase charge from a two-phase input with two wires.

9. The prism electric converter according to claim 1, wherein the converter may be used in generators, engines, electric melting furnaces, and electric.

10. The prism electric converter according to claim 1, wherein $$PENT = 2V \text{ phase} - I \text{ phase},$$

PENT=input potential in watts
V phase=phase voltage in volts
I phase=electric current of the phase in amperes
and $$PSAL = 3V \text{ phase} - I \text{ phase},$$

PSAL=output potential in watts
Vphase=phase voltage in volts
I phase=electric current of the phase in amperes.

11. The prism electric converter according to claim 1, wherein the electric system is built in three columns, wherein each column corresponds to each one of the phases.

* * * * *